United States Patent [19]
Perrin

[11] Patent Number: 6,152,432
[45] Date of Patent: Nov. 28, 2000

[54] FLUID PRESSURE SPRINGS

[75] Inventor: Etiene Perrin, Pirey, France

[73] Assignee: Draftex Industries Limited, Edinburgh, United Kingdom

[21] Appl. No.: 09/155,912

[22] PCT Filed: Mar. 18, 1997

[86] PCT No.: PCT/GB97/00741

§ 371 Date: Jan. 28, 1999

§ 102(e) Date: Jan. 28, 1999

[87] PCT Pub. No.: WO97/38238

PCT Pub. Date: Oct. 16, 1997

[30] Foreign Application Priority Data

Apr. 11, 1996 [GB] United Kingdom .................... 9607515

[51] Int. Cl.[7] ........................................................ F16F 9/14
[52] U.S. Cl. .................................. 267/64.15; 267/64.11; 267/218; 188/276; 188/297; 188/299.1
[58] Field of Search ....................... 188/297, 312, 188/299.1, 322.19, 276, 269, 322.21, 322.22; 267/64.16, 64.11, 64.25, 64.26, 118, 120, 124, 129, 64.15, 217, 218, 64.17; 16/66, 84

[56] References Cited

U.S. PATENT DOCUMENTS

| 2,564,790 | 8/1951 | Orloff et al. ............................ 267/64.15 |
| 4,428,567 | 1/1984 | Fournales ............................... 267/64.26 |

FOREIGN PATENT DOCUMENTS

| 1 530 336 | 6/1968 | France . |
| 1 437 616 | 6/1976 | United Kingdom . |
| 2 070 192 | 9/1981 | United Kingdom . |
| 2 194 047 | 2/1988 | United Kingdom . |

*Primary Examiner*—Michael Mar
*Assistant Examiner*—Thomas Williams
*Attorney, Agent, or Firm*—Leydig, Voit & Mayer, Ltd.

[57] ABSTRACT

A fluid pressure spring (8), such as for opening the hatchback door of a vehicle, comprises a hollow cylinder (10) having a fixture (24) for pivotal connection to the hatchback door. A piston (30) is connected to a hollow piston rod (114) which carries a fixture (46) for pivotal connection to the vehicle body. The interior (40, 42) of the cylinder is filled with gas under pressure, and the gas extends into a chamber (54) within the piston rod via a bore (62). A free piston (50) within the hollow piston rod (14) is subjected to exterally applied hydraulic pressure via a pipe (20) connected to a second chamber (56) within the hollow piston rod (14). Controllable increase of this pressure moves the free piston (50) to augment the gas pressure within the spring and to increase its lifting force. In this way, a remote control can bused to unlatch the hatchback door and temporarily augment the gas pressure within the spring to cause the door automatically to lift from the fully closed position to the open position. If the gas pressure within the spring is insufficient by itself to raise the hatchback door to the open position, the augmenting hydraulic pressure can not only lift the hatchback door in this way but, when released, allows the door to close under gravity.

19 Claims, 2 Drawing Sheets

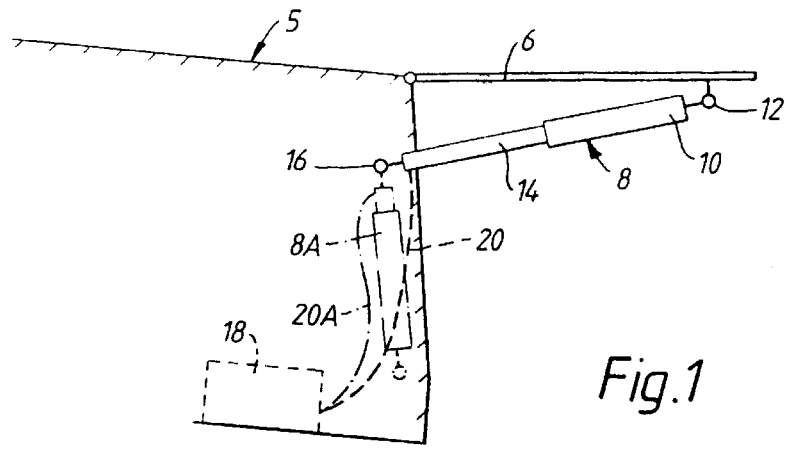
Fig.1
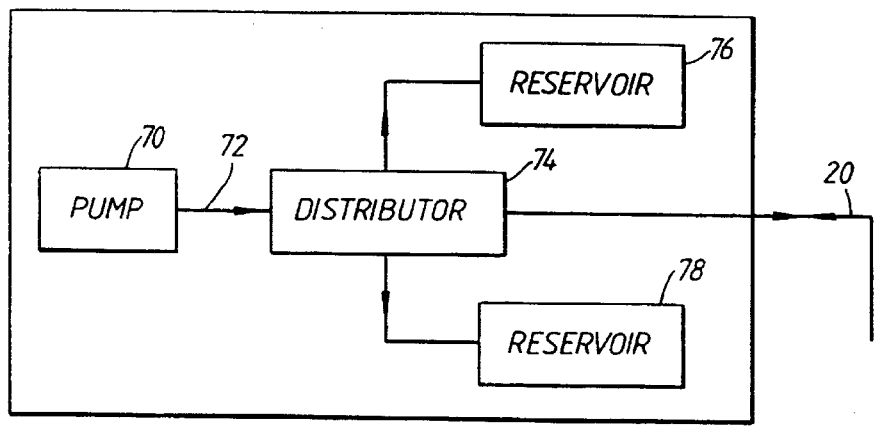
Fig.3
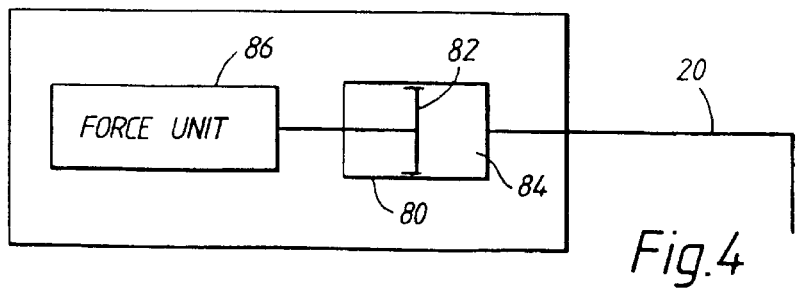
Fig.4

FLUID PRESSURE SPRINGS

The invention relates to a gas spring connected to a closure member for an opening, the closure member being movable in a first direction from a closed position to an open position and being movable in a second direction from the open position to the closed position, the closure member moving against gravity in one said direction, the spring comprising a hollow cylinder, a piston slidable within the hollow cylinder and connected go a piston rod sealingly and slidingly extending from the cylinder, the piston dividing the hollow cylinder into a first chamber between the piston and one end of the cylinder and a second main chamber through Which the piston rod extends, the first and second main chambers containing gas under pressure which tends to displace the piston rod from the cylinder, the gas spring being connected to the closure member so that such displacement of the piston rod tends to move the closure member in the said one direction, and externally controllable fluid pressure producing means for controllably augmenting the pressure of the gas.

Such a gas spring is known from EP-A-0 379 864. In this known arrangement, an external source of gas is connected directly to the first main chamber in the cylinder to vary the pressure for temperature compensation purposes. In the event of failure of the external pressure source, there could be a complete loss of pressure within this main chamber. The invention aims to deal with this problem.

In accordance with the invention, therefore, the known gas spring is characterised in that she piston rod is hollow, and by a second piston sealingly slidable within the hollow interior of the piston rod and dividing the interior of the piston rod into first piston rod chamber in communication with the second main chamber and a second piston rod chamber, and in that the externally controllable fluid pressure producing means applies externally controllable fluid pressure to and within the second piston rod chamber for moving the second piston within the hollow interior of the piston rod so as to augment the gas pressure within the first piston rod chamber and the first and second main chambers.

Fluid pressure springs embodying the invention, and for use in motor vehicles, will now be described, by way of example only, with reference to the accompanying diagrammatic drawings in which:

FIG. 1 is a schematic diagram of part of a motor vehicle body, with a hatchback door whose opening and/or closing movement is controlled and assisted by one of the springs;

FIG. 3 is a schematic diagram of one form of a hydraulic fluid system for use with the gas spring of FIG. 2; and FIG. 4 is a schematic diagram of another hydraulic fluid system for use with the gas spring of FIG. 2.

Figure 2:
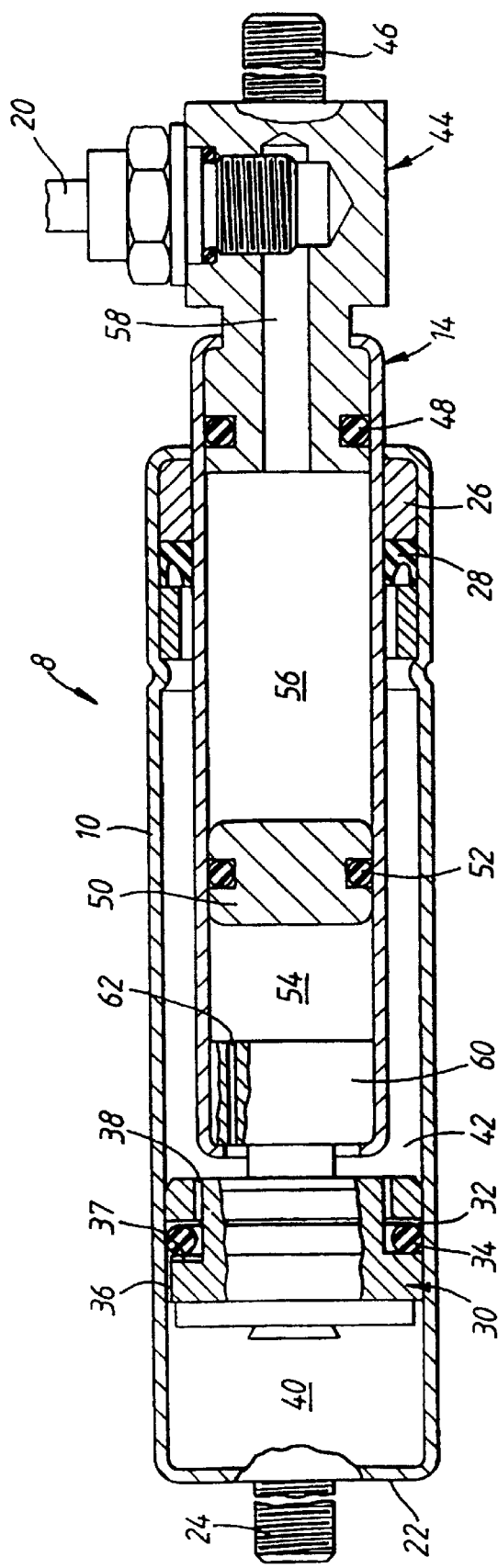
FIG. 2 is a cross-section through one or the springs.

The fluid pressure springs to be described in more detail below incorporate gas under pressure, the pressure of the gas being controllable by hydraulic means.

Referring to FIG. 1, a motor vehicle of which part is indicated diagrammatically at 5 has a horizontally pivotted hatchback door which is shown in the raised or open position. In a manner to be explained, the opening and/or closing movement of the hatchback door 6 is controlled and assisted by a fluid spring 8. The spring (to be described in more detail below) comprises a hollow cylindrical body 10 having a closed end which is connected to the hatchback door 6 by a pivotal joint 12. A piston rod 14 is sealingly slidable into and out of the opposite end of the cylinder 10 and its distal end is connected by a second pivotal joint 16 to the vehicle body 5.

The position of the fluid pressure spring 8 when the hatchback door 6 is closed is shown dotted at 8A in FIG. 1, the hollow piston rod 14 now being partially retracted within the cylindrical body 10.

The interior of the cylindrical body 10 contains gas under pressure. In the manner to be explained in more detail below, the pressure of the gas can be controllably altered by a hydraulic fluid arrangement. A source of adjustable hydraulic fluid pressure is indicated diagrammatically at 18 and is connected by a flexible fluid pipe 20 to the interior of the spring 8 via a flexible pipe 20 and the hollow interior of the piston rod 14. The position of the flexible pipe 20 when the hatchback door 6 is closed is indicated diagrammatically at 20A in FIG. 1.

The spring 8 will now be described in more detail with reference to FIG. 2. FIG. 2 shows the hollow cylindrical body 10 which is closed off at one end at 22, the end 22 supporting a fixture 24 which is connected to the pivotal joint 12 (FIG. 1) and thence to the hatchback door 6. At its opposite end, the cylindrical body 10 is provided with an aperture through which extends the hollow piston rod 14. The piston rod is supported by a guide 26. A seal 28 provides a fluid-tight seal around the outside of the piston rod 14 and between the piston rod and the cylindrical body 10.

At its end inside the cylindrical body 10, the piston rod 14 is attached to a piston 30. The piston 30 has an annular groove 32 in which is mounted a circular sealing ring 34 the diameter of which is less than the width of the groove 32. The piston has an axially directed groove 36 in its periphery, a radially directed groove 37 and axially directed bores 38. The piston 30 and the sealing ring 34 thus divide the interior of the cylindrical body 10 into two chambers 40 and 42. However, these chambers can be interconnected, in a manner to be explained, via the grooves 36 and 37 and the bores 38, depending on the position of the sealing ring 34 within the annular groove 32.

At its opposite end, the hollow piston rod 14 carries an end fitting 44 supporting a fixture 46 which is in turn connected to the pivotal joint 16 (FIG. 1) and thence to the vehicle body 5. A portion of the end fitting 44 extends into the interior of the piston rod 14 and is sealed to it by an annular seal 48. A free piston 50 is slidable within the interior of the piston rod 14 and is sealed against the interior wall of the piston rod 14 by an annular sealing ring 52. The free piston 50 thus divides the interior of the piston rod 14 into two chambers 54 and 56.

Chamber 56 is connected via a bore 58 within the end fitting 44 and thence to the hydraulic pipe 20 of FIG. 1.

At its inner end, the piston rod 14 has a fixed block 60 with a through bore 62 interconnecting the chambers 42 and 54.

During manufacture, the hollow cylindrical body 10 is filled with gas under pressure which therefore fills the chambers 40,42 and 54, but not chamber 56.

For explaining the operation of the fluid spring, the effect of the hydraulic fluid will initially be ignored. The operation of the spring is therefore dependent on the gas pressure.

The gas pressure within the cylindrical body 10 will exert a force on the piston rod 14 tending to expel the piston rod from the cylindrical body. As the gas pressure drives the piston rod 14 and the piston 30 in the direction outwardly of the cylindrical body 10, frictional force between the interior wall of the cylindrical body 10 and the sealing ring 34 shifts the sealing ring 34 to the left hand side (as viewed in FIG. 2) of the annular groove 32. A restricted passageway between chambers 40 and 42 is thus provided, through groove 36, groove 37 and bores 38, and this allows gas to transfer from chamber 42 to chamber 40 as the piston moves.

The consequential outward movement of the piston rod 14 corresponds to opening of the hatchback door 6 (FIG. 1).

Movement of the piston rod 14 in the opposite direction, that is, inwardly of the cylindrical body 10, takes place in response to an external force applied to the piston rod, corresponding in this example to a closing force exerted on the hatchback door 6. As the piston rod is forced inwardly of the cylindrical body 10, the piston 30 moves correspondingly. The frictional force between the interior wall of the cylindrical body 10 and the sealing ring 34 shifts the sealing ring 34 to the right hand side (as viewed in FIG. 2) of the groove 32. There is now a relatively large passageway connecting chambers 40 and 42 allowing relatively rapid transfer of gas from chamber 40 to chamber 42, because the gas can now flow freely around the left hand side of, and then under, the sealing ring 34, the gas flow no longer being limited by the groove 37. The gas pressure thus provides a relatively low opposing force to the inward movement of the piston rod 14 and the piston 30.

The effect of the hydraulic fluid within chamber 56 will now be considered.

Basically, the hydraulic fluid system enables the gas pressure within the cylindrical body 10 to be externally adjusted. The application of hydraulic fluid pressure into chamber 56, via the pipe 20 and the bore 58, forces the free piston 50 to the left (as viewed in FIG. 2), thus applying pressure to the gas within chamber 54 and thence to the gas within chambers 42 and 40 via the bore 62, the bore 38 and the grooves 36 and 37. The resultant increase in gas pressure depends on the pressure exerted on the free piston 50 by the hydraulic fluid. The addition of the hydraulic fluid system to the spring 8 produces a number of operational advantages as will now be described with particular reference to FIG. 1.

Referring to FIG. 1, and considering the situation when the hatchback door 6 is closed, the gas pressure within spring 10 will not on its own normally be sufficient to open the hatchback (when its catch is released). This is because the mechanical arrangement is such that the gas pressure cannot overcome the weight of the hatchback. If the hatchback is lifted slightly, through a small angle, however, the torque exerted on the hatchback door the gas spring now becomes greater than the torque exerted by the weight of the hatchback door, and the gas pressure can now lift the hatchback door to its fully open position and hold it in this position.

However, the addition of the hydraulic pressure system now enables the gas pressure to be controllably increased so that, for example, the gas pressure can be sufficient to open the hatchback door from its fully closed position (when it is unlatched). Thus, hydraulic fluid pressure is applied to chamber 56 (FIG. 2) through pipe 20 when the hatchback door is unlatched, and increases the gas pressure within cylindrical body 10 (chambers 40,42 and 54) to such an extent that the torque exerted by the spring 8 can raise the hatchback door from its fully closed position. As soon as the hatchback door has moved through a certain angle from its fully closed position, the hydraulic fluid pressure can be released or reduced, because a lesser gas pressure within the spring is sufficient to raise the hatchback door towards, and to hold it in, the fully open position.

It is therefore possible for the opening of the hatchback door to be controlled remotely such as by a telecontrol (e.g. operating by radio or infra-red radiation). Such a telecontrol would be used to send a signal to a suitable electro-mechanical receiver within the vehicle which would unlatch the hatchback door and energise the hydraulic fluid system 18, thus causing the hatchback door to be raised in the manner just explained.

In this case, closure of the hatchback door would take place manually. Thus, the hydraulic fluid pressure would be released or reduced and the weight of the hatchback door temporarily augmented by a manual downward force applied to the hatchback door to close it.

Instead, though, the operation could be modified so that the hatchback door can be both raised and lowered by the use of the hydraulic system 18 and, if desired, from a distance using a telecontrol.

In this mode, the initial gas pressure within the cylindrical body 10 would be reduced so that, on its own (that is, when not augmented by the hydraulic fluid pressure), it is insufficient to hold the hatchback door 6 open against its weight.

As before, the opening process involves the unlatching of the closed hatchback door and the application of hydraulic fluid pressure to the chamber 56 (FIG. 2). This hydraulic pressure increases the gas pressure within the cylindrical body 10 in the manner explained, until the gas pressure becomes sufficiently great to raise the hatchback door from the fully closed position and thence into the fully opened position. In this mode, though, the hydraulic fluid pressure within the chamber 56 would be maintained continuously, in order to augment the gas pressure and thereby enable it to hold the hatchback door fully open.

When it is desired to close the hatchback door in this mode, a suitable signal releases or reduces the hydraulic fluid pressure within chamber 56. The gas pressure within the cylindrical body 10 is now reduced and the weight of the hatchback door causes it to close, whereupon it may be latched. The signal may be produced by a force-sensitive transducer fitted to the spring which senses the closing force applied to the hatchback.

In this mode, the hatchback 6 may be provided with one or more proximity detectors which sense for any obstruction during controlled closing or opening of the hatchback, and stop the movement in the event of any such obstruction, such as by temporarily increasing or decreasing the hydraulic fluid pressure. Instead, or in addition, one or more position sensors, responsive to the angle of the hatchback 6, can be used to stop the opening movement of the hatchback (e.g. at a desired intermediate open position) such as by decreasing the hydraulic pressure.

The spring shown in FIG. 2 is advantageous because the application of the hydraulic pressure by means of the movable separator 50 within the hollow piston rod 14 provides a compact arrangement. In addition, the arrangement provides a mechanical advantage as compared with an arrangement in which the piston rod 14 is not hollow and in which the hydraulic pressure acts directly on a separator slidable in the cylinder 10.

FIGS. 3 and 4 show suitable hydraulic systems by way of example only.

FIG. 3 shows a hydraulic pump 70 which applies hydraulic fluid through a pipe 72 to a controllable distributor 74. The distributor 74 is switchable between a setting in which the pumped hydraulic fluid is fed into a reservoir 76 and a setting in which the pumped hydraulic fluid is fed along pipe 20 (see FIG. 1) to the end unit 44 of FIG. 2 and thence into the chamber 56 of the spring 8. When the distributor 74 switches the pumped hydraulic fluid into the reservoir 76, so that the pipe 20 is no longer pressurised by the hydraulic fluid, the hydraulic fluid is returned to a second reservoir 78 by the pressure exerted on the free piston 50 by the gas within the spring. Reservoirs 76 and 78 are connected by means not shown to feed back to a main reservoir from which the fluid is pumped by the pump 70.

The distributor 74 may be electrically or electronically controllable, such as by a telecontrol for the purpose already described.

In FIG. 4, a piston-cylinder unit 80 is provided, having a piston 82 acting on hydraulic fluid within the closed off end 84 of the cylinder. This closed-off end is connected by the pipe 20 to the spring 8 and thence to the chamber 56. An electrically energisable force unit 86 is provided which can be electrically energised to exert a force on the piston 82 which in turn pressurises the hydraulic fluid and forces it into the chamber 56. When the force unit 86 is de-energised, the force exerted on the free piston 50 by the gas within the spring displaces the hydraulic fluid back into the closed-off end 84 of the piston-cylinder arrangement 80. Again, the force exerting unit 86 can be controlled electrically or electronically such as by a suitable tele-control. It is advantageous to use a piston-cylinder unit 80 having a relatively great length and a relatively small diameter. Such an arrangement enables better control of the pressure.

In cold weather, the gas pressure within the cylindrical body 10 will tend to decrease. A temperature sensor can be incorporated to increase the hydraulic pressure correspondingly so as to ensure that the hatchback opens correctly and also that it is held securely in the fully open position if the reduced gas pressure in cold weather is insufficient on its own to do this. If the temperature sensor increases the hydraulic pressure in order to hold the hatchback 6 in the open position, it may be difficult for the user to close the hatchback. The user may therefore have to release the hydraulic pressure manually to lower the hatchback. Alternatively, the spring can be fitted with a force-sensitive transducer which senses the application of a closing force to the hatchback and automatically releases the hydraulic pressure.

Although the foregoing description has referred to the use of hydraulic fluid pressure for controlling and temporarily augmenting the gas pressure within the spring 8, the pressure within chamber 56 can be a controllable gas pressure instead, such as generated pneumatically.

What is claimed is:

1. A gas spring in combination with and connected to a closure member for an opening, the closure member being movable in a first direction from a closed position to an open position and being movable in a second direction from the open position to the closed position, the closure member moving against gravity in one said direction, the spring comprising a hollow cylinder, a piston slidable within the hollow cylinder and connected to a piston rod sealingly and slidingly extending from the cylinder, the piston rod being hollow and defining a hollow interior, the piston dividing the hollow cylinder into a first chamber between the piston and one end of the cylinder and a second main chamber through which the piston rod extends, the first and second main chambers containing gas under pressure which ends to displace the piston rod from the cylinder, means connecting the gas spring to the closure member so that such displacement of the piston rod tends to move the closure member in the said one direction, and externally controllable fluid pressure producing means for controllably augmenting the pressure of the gas, and a second piston sealingly slidable within the hollow interior of the piston rod and dividing the interior of the piston rod into a first piston rod chamber in communication with the second main chamber and a second piston rod chamber, the externally controllable fluid pressure producing means applying externally controllable fluid pressure to and within the second piston rod chamber for moving the second piston within the hollow interior of the piston rod so as to augment the gas pressure within the first piston rod chamber and the first and second main chambers.

2. A spring according to claim 1, including a fluid passage extending through the piston rod from externally of the cylinder to the second piston rod chamber and for connection to the externally controllable fluid pressure producing means.

3. A spring according to claim 1, characterised the first and second main chambers are interconnected by means defining a restricted gas-flow passageway for enabling gas to transfer from the second main chamber to the first main chamber as the said displacement of the piston rod takes place, and to enable transfer of the gas from the first main chamber to the second main chamber when the piston rod is moved inwardly of the cylinder in response to a force applied externally to the piston rod in the direction opposite to the said one direction.

4. A spring according to claim 3, including valve means automatically responsive to the direction of movement of the piston within the cylinder to allow increased gas flow through the said passageway when the piston rod is moved inwardly of the cylinder.

5. A spring according to claim 4, in which the valve means comprising sealing means for providing a seal between the piston and the cylinder, the sealing means being bodily movable in response to frictional force exerted on it by movement of the piston, such bodily movement being between a position in which the sealing means provides partial blockage of the restricted passageway and a position in which it is relatively clear of the restricted passageway.

6. A spring according to claim 1, including control means for controlling the magnitude of the externally applied fluid pressure.

7. A spring according to claim 6, in which the control means is remotely operable.

8. A spring according to claim 7, in which the control means is wirelessly operable.

9. A spring according to claim 1, including a force-sensitive transducer responsive to a force applied manually to the closure member in a direction opposite to the said one direction for reducing the fluid pressure produced by the externally controllable fluid pressure producing means.

10. A spring according to claim 1 in which the pressure of the gas when not augmented is insufficient to move the closure member in the said one direction from an initial position but is sufficient to move it in that direction from an intermediate position adjacent to but slightly displaced from the initial position and is sufficient to hold the body in a final position, whereby the externally controllable fluid pressure means is operative to augment the pressure of the gas sufficiently to enable it to move the closure member from the initial position.

11. A spring according to claim 1, in which the pressure of the gas when not augmented is insufficient to move the closure member in the said one direction, whereby the externally controllable fluid pressure means is operative to augment the pressure of the gas sufficiently to move the closure member in that direction from an initial position to a final position and to hold it in the final position and is operative to reduce the gas pressure to the unaugmented value to allow the closure member to return to the initial position under gravity.

12. A spring according to claim 1, in which the closure member is a substantially horizontally hinged closure member, on a vehicle.

13. A spring according to claim 1, including sensing means responsive to movement of the closure member for controllably halting such movement if an obstruction is sensed.

14. A spring according to claim 13, in which the sensing means is a proximity detector.

15. A spring according to claim 13, in which the sensing means is a position detector.

16. A spring according to claim 13, in which the sensing means halts the movement of the closure member if an obstruction is detected by altering the fluid pressure produced by the fluid pressure producing means.

17. A spring according to claim 1, including a temperature sensor for adjusting the fluid pressure produced by the fluid pressure producing means to compensate for changes in the gas pressure and the fluid pressure produced by temperature changes.

18. A spring according to claim 1, in which the externally controllable fluid pressure means comprises externally controllable hydraulic pressure means.

19. A spring according to claim 1, in which the externally controllable fluid pressure means comprises externally controllable gas pressure means.

* * * * *